United States Patent
Hashizume et al.

(10) Patent No.: US 6,778,341 B2
(45) Date of Patent: Aug. 17, 2004

(54) METHOD FOR MANUFACTURING LIGHT-SELECTIVE PRISM

(75) Inventors: Toshiaki Hashizume, Okaya (JP); Yuji Takado, Matsumoto (JP); Takeshi Takezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 2 days.

(21) Appl. No.: 10/333,797

(22) PCT Filed: Jan. 28, 2002

(86) PCT No.: PCT/JP02/00613

§ 371 (c)(1),
(2), (4) Date: Jan. 24, 2003

(87) PCT Pub. No.: WO02/061468

PCT Pub. Date: Aug. 8, 2002

(65) Prior Publication Data

US 2003/0169507 A1 Sep. 11, 2003

(30) Foreign Application Priority Data

Jan. 31, 2001 (JP) ........................................ 2001-22636

(51) Int. Cl.[7] ................................................ G02B 5/04
(52) U.S. Cl. ...................................... 359/831; 359/634
(58) Field of Search ................................ 359/831, 833, 359/834, 835, 836, 837, 634

(56) References Cited

U.S. PATENT DOCUMENTS 5,837,082 A * 11/1998 Grafe .......................... 359/831
6,101,041 A    8/2000 Ishibashi et al.
6,250,763 B1   6/2001 Fielding et al.

FOREIGN PATENT DOCUMENTS

| JP | A 10-221510 | 8/1998 |
| JP | A 10-325954 | 12/1998 |
| JP | A 11-84112 | 3/1999 |
| JP | A 11-352440 | 12/1999 |
| JP | A 2000-143264 | 5/2000 |
| WO | WO 98/20383 | 5/1998 |

* cited by examiner

*Primary Examiner*—Euncha Cherry
(74) *Attorney, Agent, or Firm*—Oliff & Berridge, PLC

(57) ABSTRACT

The present invention provides a technique for improving the optical characteristics of a light-selective prism. By cutting a block along a plane perpendicular to a first direction, a plurality of first small blocks are obtained. A first selective film is formed on the cut face of the first small block, and the plurality of first small blocks are stuck together so as to obtain a first processed block in which the first selective film is located at the interface of adjacent two first small blocks. Next, by cutting the first processed block along a plane perpendicular to a second direction that is substantially perpendicular to the first direction, a plurality of second small blocks are obtained. A second selective film is formed on the cut face of the second small block, and the plurality of second small blocks are stuck together to obtain a second processed block in which the second selective film is located at the interface of adjacent two second small blocks. Light-selective prisms in which two kinds of selective films are formed on an almost X shape interface is obtained from the second processed block.

13 Claims, 15 Drawing Sheets

METHOD FOR MANUFACTURING LIGHT-SELECTIVE PRISM

TECHNICAL FIELD

The present invention relates to a light-selective prism for use in a projector or the like.

BACKGROUND ART

In projectors, light emitted from an illuminating optical system is modulated by means of a liquid crystal light valve in response to image information (image signal), and the modulated light is projected onto a screen.

In projector for projecting color images, a colored light separating optical system is provided for separating light emitted from an illuminating optical system into three colored lights, and a colored light combining optical system for combining three modulated lights emitted from three liquid crystal light valves. As a colored light combining optical system, a light-selective prism (cross dichroic prism) is used for example, having two types of selective films formed at an almost "X" shape interface of four rectangular prisms.

Selective prisms are conventionally manufactured by independently preparing four rectangular prisms and then sticking them together. A method for manufacturing a selective prism of this kind is described, for example, in JAPANESE PATENT LAID-OPEN GAZETTE No. H11-352440 disclosed by the present applicant.

However, where four rectangular prisms are prepared independently in the above manner, sometimes the desired optical characteristics of the light-selective prism are not obtained. One cause of this is that there is variation in the refractive index of each rectangular prism. This variation of refractive index can occur, for example, by using light-transmissive parts of different lots to form each rectangular prism.

DISCLOSURE OF THE INVENTION

The object of the present invention is thus to solve the drawbacks of the prior art discussed above and to provide a technique for improving optical characteristics of a light-selective prism.

At least part of the above and the other related issues are solved through the method for manufacturing a light-selective prism in the present invention. The light-selective prism has a substantially regular tetragonal columnar outer shape and includes two kinds of selective films, formed on an almost X shape interface, each selective film selecting colored light having wavelengths of a predetermined range. The manufacturing method comprises the steps of: (a) preparing a block formed of a light transmissive member; (b) cutting the block along at least one plane perpendicular to a first direction so as to obtain a plurality of first small blocks whose dimension in the first direction is substantially equal to a predetermined dimension; (c) forming a first selective film on a cut face of at least one of the plurality of the first small blocks; (d) sticking the plurality of the first small blocks together so as to obtain a first processed block in which the first selective film is situated at an interface of adjacent two first small blocks; (e) cutting the first processed block along at least one plane perpendicular to a second direction that is substantially perpendicular to the first direction so as to obtain a plurality of second small blocks whose dimension in the second direction is substantially equal to the predetermined dimension; (f) forming a second selective film on a cut face of at least one of the plurality of the second small blocks; (g) sticking the plurality of the second small blocks together so as to obtain a second processed block in which the second selective film is situated at an interface of adjacent two second small blocks; and (h) obtaining at least one light-selective prism from the second processed block.

With the method of the present invention, the light-selective prism is manufactured from the single block. Thus, variation in refractive index of light-transmissive parts constituting the light-selective prism that occurs due to differences among lots can be reduced, and as a result of this, it is possible to improve optical characteristics of the light-selective prism.

In the above method, it is preferable that the step (b) includes polishing the cut faces of the first small blocks; and that the step (e) includes polishing the cut faces of the second small blocks.

By so doing, the film formation face of a first small block on which a first selective film is formed, and the film formation face of a second small block on which a second selective film is formed, can be planarized, so the degree of adhesion of the first and second selective films to the first and second small blocks can be improved, respectively.

Here, the step (h) may include cutting the second processed block so as to obtain a plurality of the light-selective prisms.

By so doing, the plurality of the light-selective prisms can be obtained from the single block.

In the above method, the step (d) may include sticking the plurality of the first small blocks together such that the outer shape of the block is reproduced; and the step (g) may include sticking the plurality of the second small blocks together such that the outer shape of the block is reproduced.

Here, it is preferable that the step (d) includes sticking the plurality of the first small blocks together such that each portion of the light transmissive member constituting each first small block is placed in the same location within the block; and the step (g) includes sticking the plurality of the second small blocks together such that each portion of the light transmissive member constituting each second small block is placed in the same location within the block.

Even within a single block, there are instances in which there is variation in the refractive index depending on spatial position. Thus, by proceeding in the manner described above, spatial variation in refractive index of light-transmissive parts constituting a light-selective prism can be reduced, and it becomes possible to improve the optical characteristics of the light-selective prism.

Alternatively, the step (d) may include sticking the plurality of the first small blocks together in a state such that adjacent two first small blocks are dislocated in a direction substantially perpendicular to the first and the second directions; and the step (g) may include sticking the plurality of the second small blocks together such that an outer shape of the first processed block is reproduced.

In this arrangement, the plurality of second small blocks can be stuck together by utilizing the dislocation formed between two adjacent first small blocks. Therefore, when sticking the plurality of second small blocks together, the first selective film portions divided due to cutting out of the plurality of second small blocks can be easily arranged within the same plane.

Here, it is preferable that the step (d) includes sticking the plurality of the first small blocks together such that each portion of the light transmissive member constituting each first small block is placed in substantially the same location within the block; and the step (g) includes sticking the plurality of the second small blocks together such that each portion of the light transmissive member constituting each second small block is placed in the same location within the first processed block.

In the above method, it is preferable that the first selective film is a blue light reflecting film for selectively reflecting blue light; and that the second selective film is a red light reflecting film for selectively reflecting red light.

Within the light-selective prism, the first selective film is formed in a divided state, but the second selective film is formed in a continuous state. The sensitivity of the human eye is higher to red light than to blue light. Therefore, by setting the first selective film and the second selective film to a blue light reflecting film and a red light reflecting film respectively, segmentation of the first selective film does not stand out compared to the case of the reverse setting.

In the above method, it is preferable that the block has a substantially rectangular parallelopiped shape, and that the at least one plane perpendicular to the first direction and the at least one plane perpendicular to the second direction are set to planes inclined by about 45 degrees with respect to each side of one pair of opposing faces of the block.

By so doing, the light-transmissive member that forms a block can be utilized without waste, and at least one light-selective prism can be obtained.

In the above method, it is preferable that the light transmissive member is a member having a thermal conductivity of at least about 5.0 W/(m·K).

By so doing, the temperature rise of the light-selective prism per se can be reduced. Further, when an optical component of relatively large heat generation such as a polarizing plate or retardation plate is attached to the light-selective prism, temperature rise of these optical components can be reduced as well.

In the above method, it is preferable that the light transmissive member is a uniaxial crystal member, and that the first and second directions are set to directions substantially perpendicular to an optic axis of the uniaxial crystal.

Here, the uniaxial crystal member may be a monocrystalline sapphire member or a rock crystal member.

Uniaxial monocrystalline members can be used as light-transmissive members with relatively high thermal conductivity. However, when linear polarized light enters a uniaxial monocrystalline, the state of polarization thereof is changed in some cases. If the relationship of the first and second directions and the optic axis of the monocrystal is set as mentioned above, the state of polarization of linear polarized light will not be changed.

BEST MODE FOR CARRYING OUT THE INVENTION

A. First Embodiment

Figure 1:
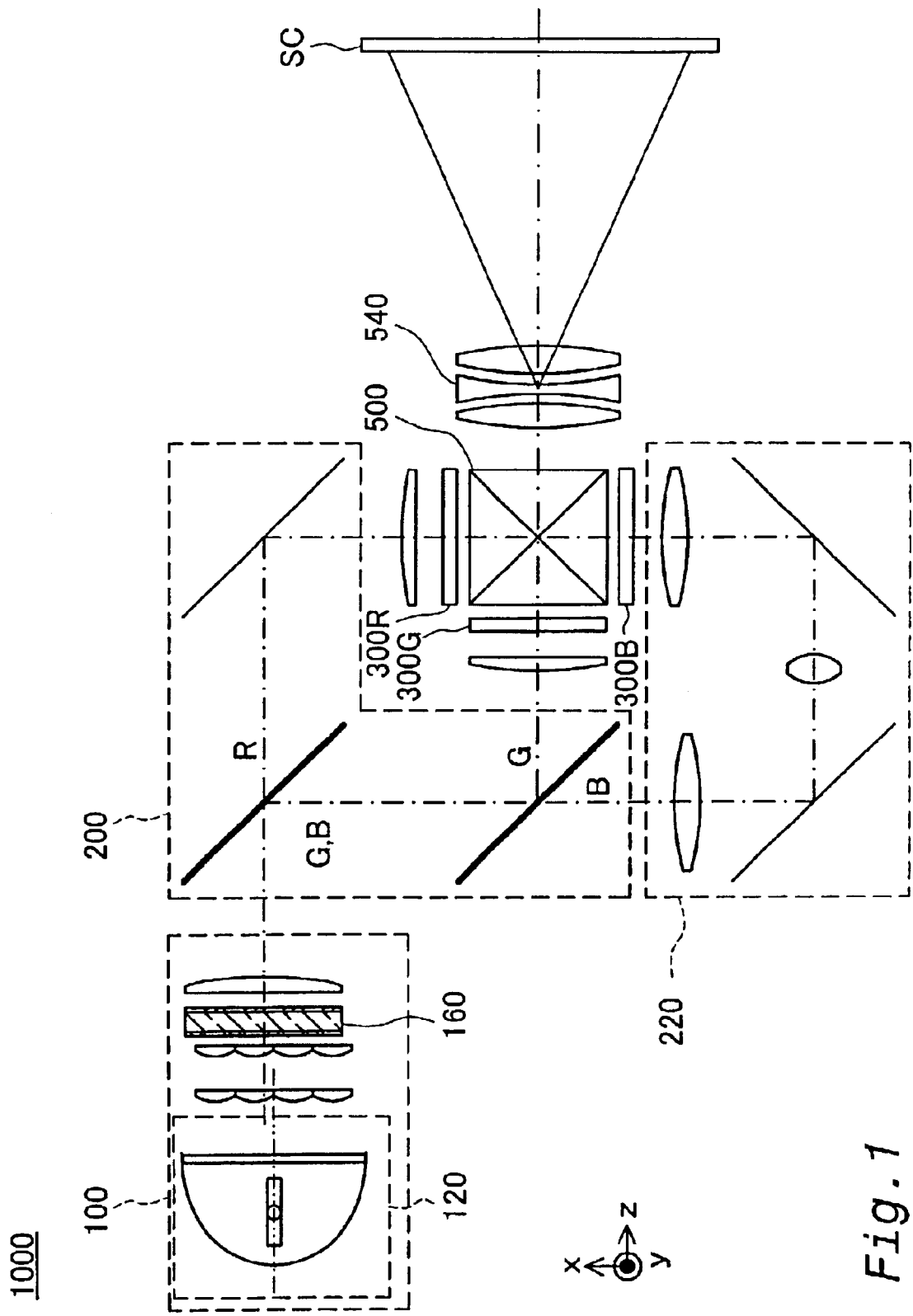
FIG. 1 is an explanatory diagram showing a projector including a cross dichroic prism manufactured by implementing the present invention.

A-1. General Structure of Projector:

One mode of carrying out the present invention is discussed below as a preferred embodiment. FIG. 1 is an explanatory diagram showing a projector including a cross dichroic prism manufactured by implementing the present invention. The projector 1000 comprises: an illuminating optical system 100, a colored light separating optical system 200, a relay optical system 220, three liquid crystal light valves 300R, 300G, 300B, a cross dichroic prism 500, and a projecting optical system 540.

The illuminating optical system 100 includes a polarized light generating optical system 160, converts light emitted from a light source device 120 into a single kind of linearly polarized light having the same polarization direction and emits the converted light. The light emitted from the illuminating optical system 100 is separated by the colored light separating optical system 200 into three colored lights, red (R), green (G) and blue (B). The separated colored lights are modulated by liquid crystal light valves 300R, 300G, 300B in response to the image information (image signal). The three modulated colored lights are combined by cross dichroic prism 500, and the composite light is projected onto a screen SC by the projecting optical system 540. This arrangement allows a color image to be displayed on the screen SC. Regarding the structure and function of parts of the projector shown in FIG. 1, as there is a detailed description, for example, in JAPANESE PATENT LAID-OPEN GAZETTE No. H10-325954 disclosed by the present applicant, a detailed description is omitted in this specification.

Figure 2:
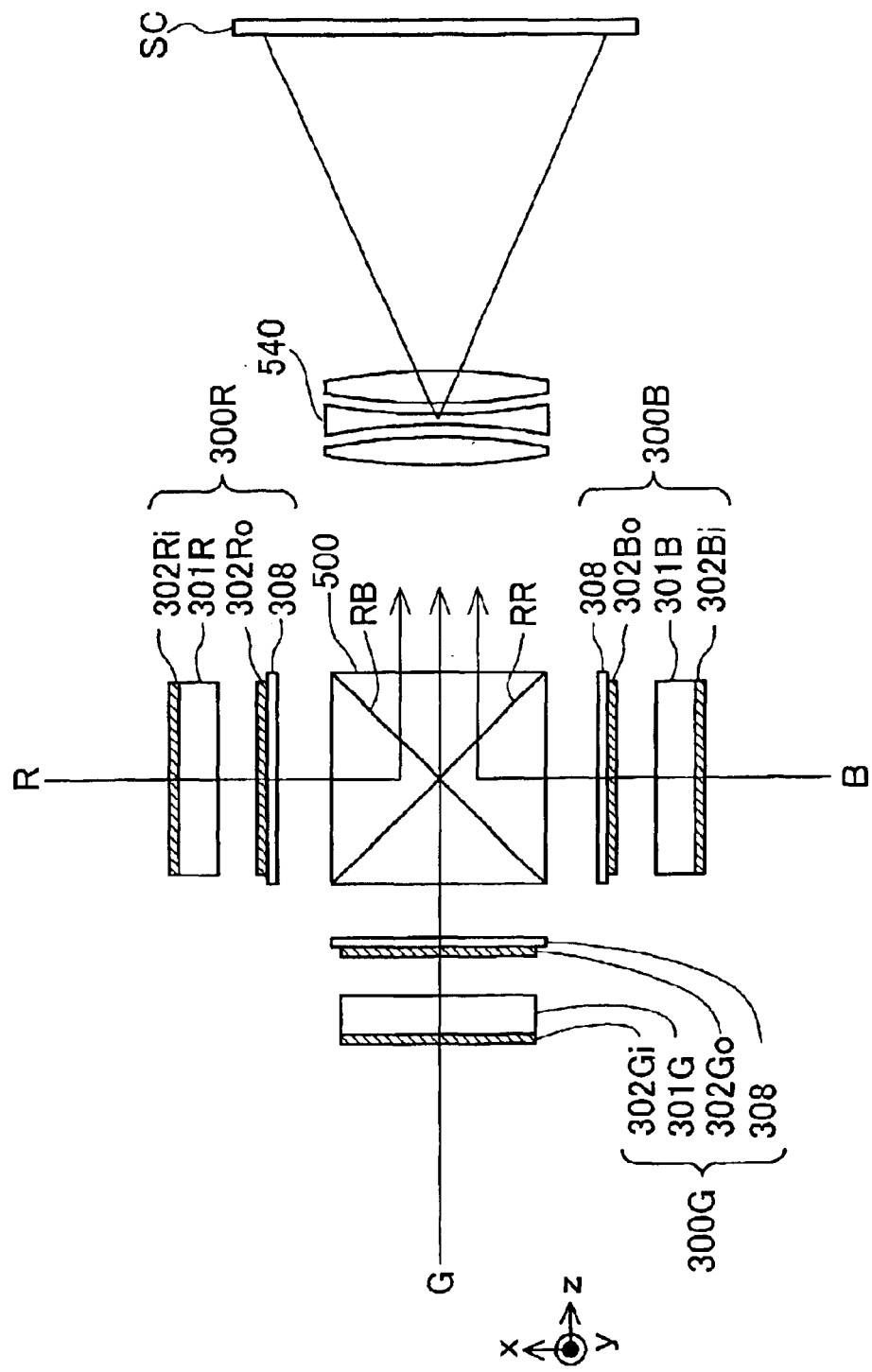
FIG. 2 is an explanatory diagram showing a relevant portion of the projector 100 of FIG. 1.

FIG. 2 is an explanatory diagram showing a relevant portion of the projector 100 of FIG. 1. In FIG. 2, three liquid crystal light valves 300R, 300G, 300B and the cross dichroic prism 500 of FIG. 1 are shown.

Colored lights R, G, B enter the first through third liquid crystal light valves 300R, 300G, 300B, respectively. Modulated light (linearly polarized light) of colored light R emitted from the first liquid crystal light valve 300R is reflected by the red light reflecting film RR of the cross dichroic prism 500, and modulated light (linearly polarized light) of colored light B emitted from the third liquid crystal light valve 300B is reflected by the blue light reflecting film RB. On the other hand, modulated light (linearly polarized light) of colored light G emitted from the second liquid crystal light valve 300G passes through the two reflecting films RB, RR of the cross dichroic prism 500. In this way, the three modulated lights are combined, and a color image is displayed on screen SC by the projecting optical system 540. In FIG. 2, for convenience of illustration, the positions at which red light and blue light are reflected are portrayed at locations shifted away from the two reflecting films RB, RR.

The first liquid crystal light valve 300R comprises a liquid crystal panel 301R, and two polarizing plates 302Ri, 302Ro, provided on the light incident side and light exiting side thereof. The first polarizing plate 302Ri provided on the light incident side is attached to the liquid crystal panel 301R. On the other hand, the second polarizing plate 302Ro provided on the light exiting side is attached on a light transmissive substrate 308 at a location away from the liquid crystal panel 301R.

Colored light R incident on the first liquid crystal light valve 300R is emitted from the illuminating optical system 100 (FIG. 1) which includes a polarized light generating optical system 160, and is therefore linearly polarized light. The polarization axis of the first polarizing plate 302Ri provided on the light incident side of liquid crystal light valve 300R is set so as to be the same as the polarization direction of incident linearly polarized light. Thus, colored light R incident on the first polarizing plate 302Ri mostly passes through the first polarizing plate 302Ri. Polarized light emitted from first polarizing plate 302Ri is modulated by liquid crystal panel 301R. The second polarizing plate 302Ro allows transmission of only that light component having a polarization direction the same as the polarization axis thereof, from the components of light modulated by liquid crystal panel 301R. Modulated light (linearly polarized light) emitted from the second polarizing plate 302Ro passes through light transmissive substrate 308 and enters cross dichroic prism 500.

In the above-described manner, the first polarizing plate 302Ri transmits substantially all incident linearly polarized light, whereas the second polarizing plate 302Ro blocks some of the incident modulated light. Thus, the second polarizing plate 302Ro generates greater heat than does the first polarizing plate 302Ri. In FIG. 2, in order to reduce the temperature rise of the second polarizing plate 302Ro which experiences relatively high heat generation, the second polarizing plate 302Ro only is provided on a separately provided light transmissive substrate 308 that has a relatively high thermal conductivity. The second and third liquid crystal light valves 300G, 300B are arranged similarly.

Incidentally, cross dichroic prism 500 combines the three modulated colored lights (linearly polarized light) emitted from the liquid crystal light valves, and the optical characteristics of cross dichroic prism 500 are highly dependent on its manufacturing method. In this embodiment, by manipulating the manufacturing method of the cross dichroic prism, its optical characteristics are improved.

Figure 3:
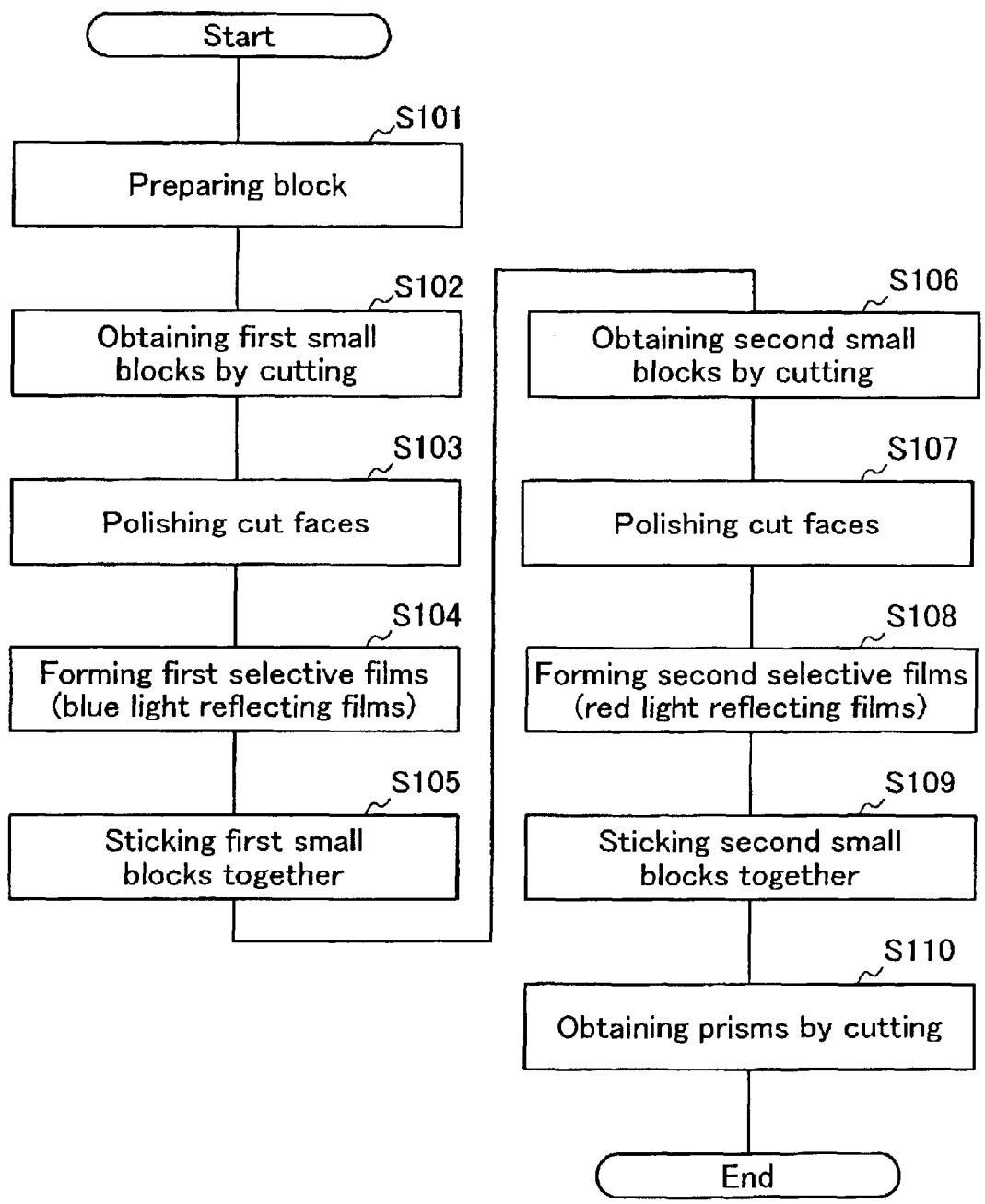
FIG. 3 is a flow chart showing a method for manufacturing a cross dichroic prism 500.

A-2. Manufacturing Method for Cross Dichroic Prism:

FIG. 3 is a flow chart showing a method for manufacturing a cross dichroic prism 500. In this embodiment, a plurality of cross dichroic prisms 500 are manufactured simultaneously. One of these is then used in the projector 1000 shown in FIG. 1.

Figure 4:
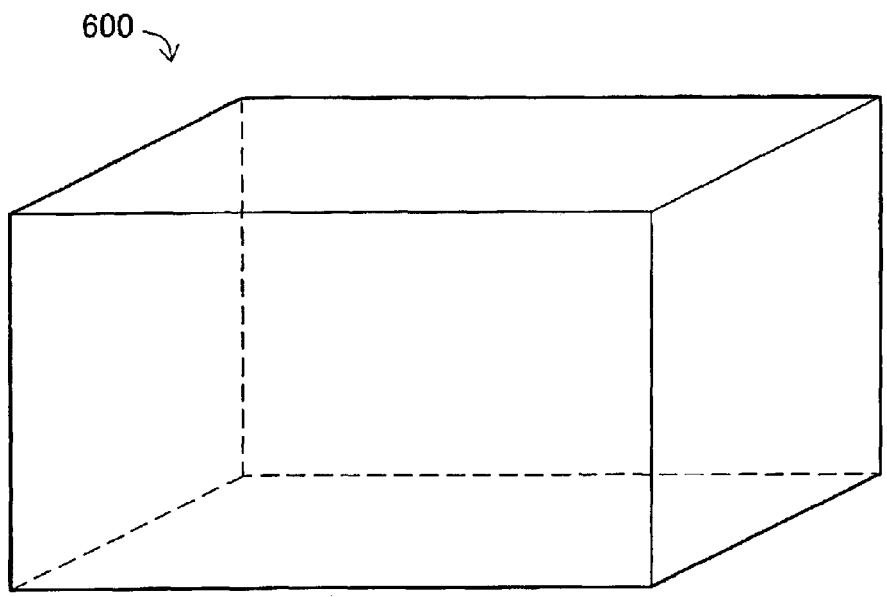
FIG. 4 is an explanatory diagram showing a prepared block 600.

In Step S101, a block formed of a light transmissive member is prepared. FIG. 4 is an explanatory diagram showing a prepared block 600. The block (hereinafter also referred to as "original block") 600 has an outer shape of a substantially rectangular parallelopiped form, and is formed of glass. Specifically, the block 600 is produced by the press forming of melting glass using a mold.

Figure 5:
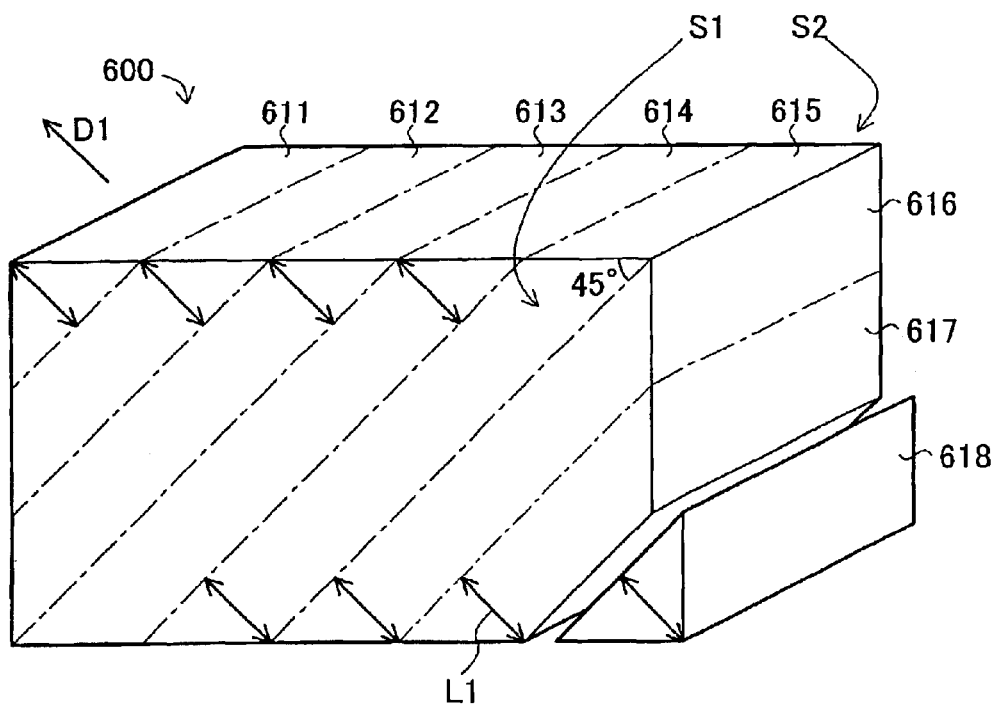
FIG. 5 is an explanatory diagram showing the aspect of cutting the block 600.

In Step S102, by cutting the block 600, a plurality of first small blocks are obtained. FIG. 5 is an explanatory diagram showing the aspect of cutting the block 600. In this embodiment, as shown in the drawing, the block 600 is cut along seven planes indicated by the dashed lines, so as to obtain eight first small blocks 611–618. These seven planes are planes perpendicular to a first direction D1, in other words, planes having the first direction D1 as the normal, and planes inclined by about 45 degrees with respect to each side of an opposing pair of faces S1, S2 of the block 600. The seven planes are also set such that distances between two adjacent planes are substantially equal. Thus, the dimension L1 in the first direction D1 is substantially the same in each of the first small blocks 611–618. No. 1 and No. 8 first small blocks 611, 618 have outer shapes of substantially triangular column form, and No. 2 through No. 7 first small blocks 612–617 have outer shapes of substantially tetragonal column form.

In Step S103, the cut faces of first small blocks 611–618 are polished. Specifically, regarding the two first small blocks 611, 618 located at the two ends, the one cut face of each is polished, and regarding the other six first small blocks 612–617, the two cut faces of each are polished. If the cut faces of the first small blocks are relatively flat, the polishing process in Step S103 can be omitted.

Figure 6:
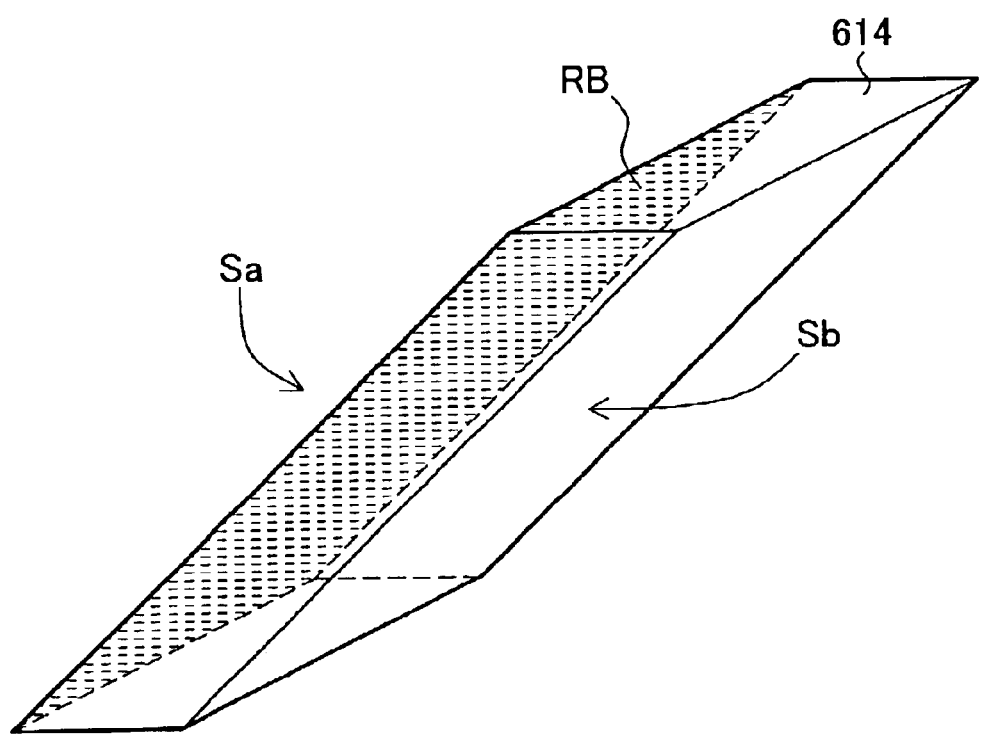
FIG. 6 is an explanatory diagram showing the No. 4 first small block 614 enlarged.

In Step S104, first selective films are selectively formed for the eight first small blocks 611–18. Here, a blue light reflecting film that selectively reflects blue light is formed as the first selective film . In this embodiment, a blue light reflecting film is formed on one polished cut face of each of seven blocks, namely, the No. 2 through No. 8 first small blocks 612–618. More specifically, a blue light selective film is formed on one of the two cut faces at which two adjacent first small blocks were in contact. FIG. 6 is an explanatory diagram showing the No. 4 first small block 614 enlarged. As shown in the drawing, the No. 4 first small block 614 has two cut faces Sa, Sb, and the blue light reflecting film RB is formed on the one face Sa that is closer to the No. 1 first small block 611 (FIG. 5). The same is true for the other six first small blocks 612–613, 615–618. However, the No. 8 first small block 618 has only one cut face, and the blue light reflecting film RB is formed on this face. By forming a first selective film on a polished cut face, it is possible to improve adhesion of the first selective film to the first small block.

Figure 7:
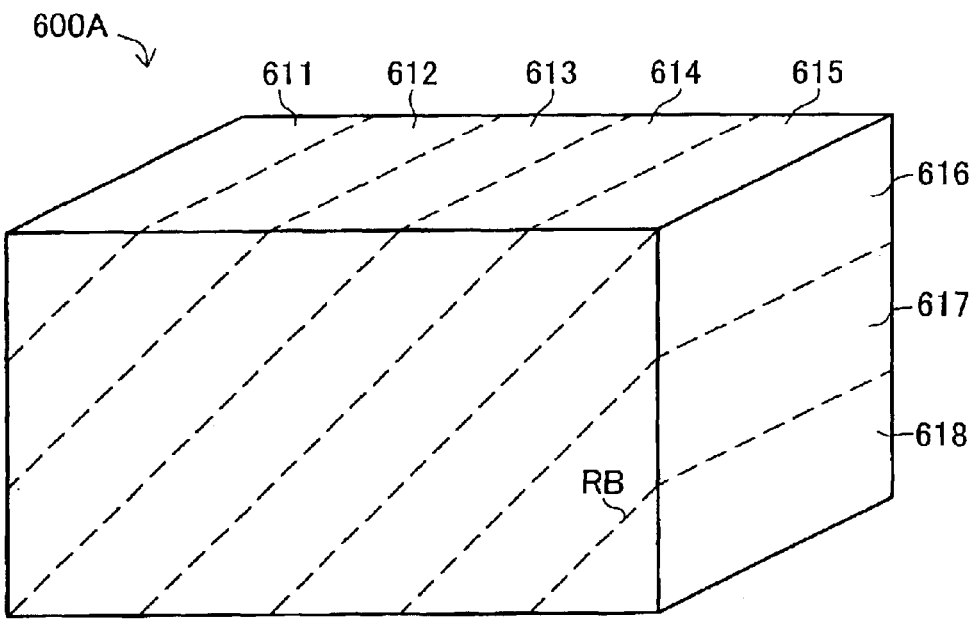
FIG. 7 is an explanatory diagram showing a first processed block 600A.

In Step S105, by sticking the eight first small blocks 611–618 together with adhesive, a first processed block is produced. FIG. 7 is an explanatory diagram showing a first processed block 600A. As shown in the drawing, the first processed block 600A has an outer shape of substantially rectangular parallelopiped form, and the outer shape of the original block 600 of FIG. 4 is reproduced. The eight first small blocks 611–618 are stuck together in a condition such that the blue light reflecting film RB is arranged at the interface of two adjacent first small blocks. The eight first small blocks 611–618 are also stuck together in such a way that each portion of the light transmissive member constituting each small block is placed in the same location within the original block 600.

At this time, it is preferable that the six faces of the first processed block 600A are polished. This is done to remove film material deposited on portions other than the face on which film is supposed to be formed during forming of the blue light reflecting film RB in Step S104, and to remove adhesive deposited on portions other than the face that is supposed to be bonded during sticking of the first small blocks together in Step S105. By so doing, the six faces of the first processed block 600A can be designated as reference faces for the cutting process in Step S106.

Figure 8:
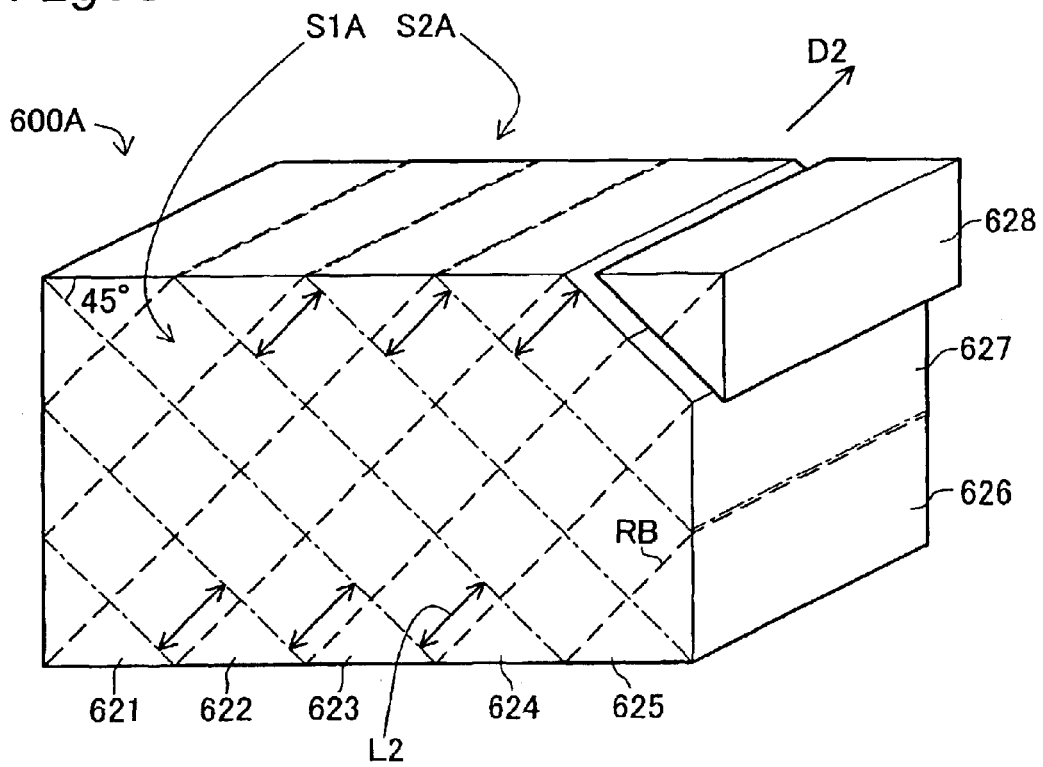
FIG. 8 is an explanatory diagram showing the aspect of cutting the first processed block 600A.

In Step S106, in the same manner as Step S102, by cutting the first processed block 600A, a plurality of second small blocks are obtained. FIG. 8 is an explanatory diagram showing the aspect of cutting the first processed block 600A. In this embodiment, as shown in the drawing, the first processed block 600A is cut along seven planes indicated by the dashed lines so as to obtain eight second small blocks 621–628. These seven planes are planes perpendicular to a second direction D2, in other words, planes having the second direction D2 as the normal, and planes inclined by about 45 degrees with respect to each side of an opposing pair of faces S1A, S2A of the first processed block 600A. The opposing pair of faces S1A, S2A of the first processed block 600A is the same as the opposing pair of faces S1, S2 of the original block 600 shown in FIG. 5. The second direction D2 is a direction substantially perpendicular to the first direction D1, in other words, substantially parallel to the faces on which the blue light reflecting films RB were formed. Also, the seven planes are set such that distances between two adjacent planes are substantially equal. Thus, the dimension L2 in the second direction D2 is substantially the same in each second small block 621–628. Dimension L2 of the second small blocks is set to the same value as dimension L1 of the first small blocks (FIG. 5).

In Step S107, in the same manner as in Step S103, the cut faces of the second small blocks 621–628 are polished. If the cut faces of the second small blocks are relatively flat, the polishing process in Step S107 can be omitted.

Figure 9:
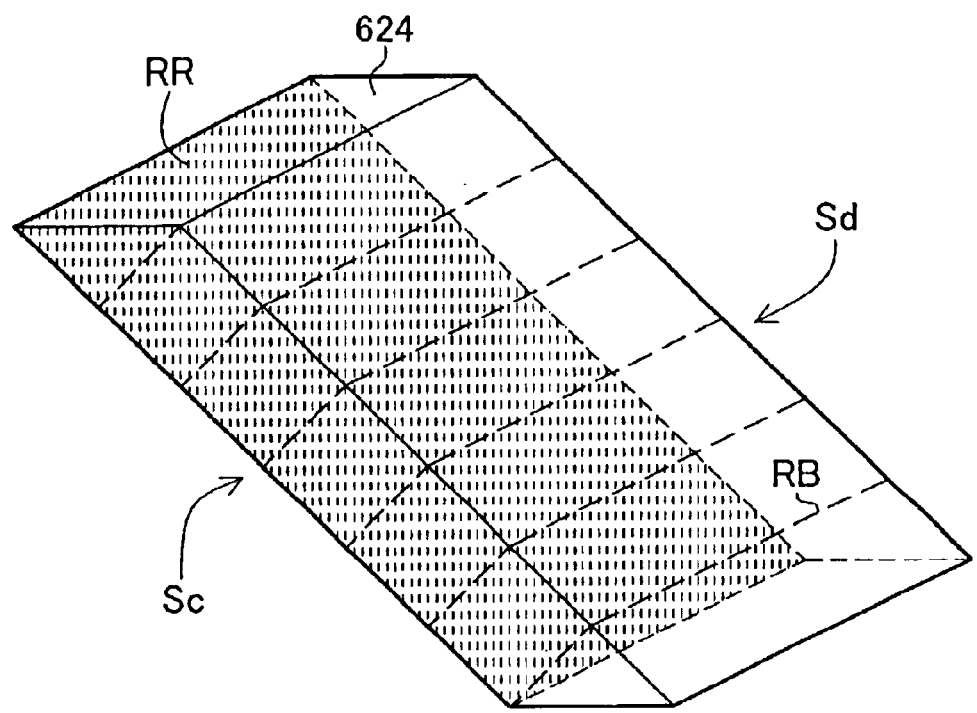
FIG. 9 is an explanatory diagram showing the No. 4 second small block 624 enlarged.

In Step S108, second selective films are selectively formed for the eight second small blocks 621–628. Here, as the second selective film, a red light reflecting film is formed that selectively reflects red light. In this embodiment, a red light reflecting film is formed on one polished cut face of each of seven blocks, namely, the No. 2 through No. 8 second small blocks 622–628. More specifically, a red light selective film is formed on one of the two cut faces at which two adjacent second small blocks were contacting. FIG. 9 is an explanatory diagram showing the No. 4 second small block 624 enlarged. As shown in the drawing, the No. 4 second small block 624 has two cut faces Sc, Sd, and the red light reflecting film RR is formed on the one face Sc that is closer to the No. 1 second small block 621 (FIG. 8). The same is true of the other six second small blocks 622–623, 625–628. By forming a second selective film on a polished cut face, it is possible to improve adhesion of the second selective film to the second small block.

Figure 10:
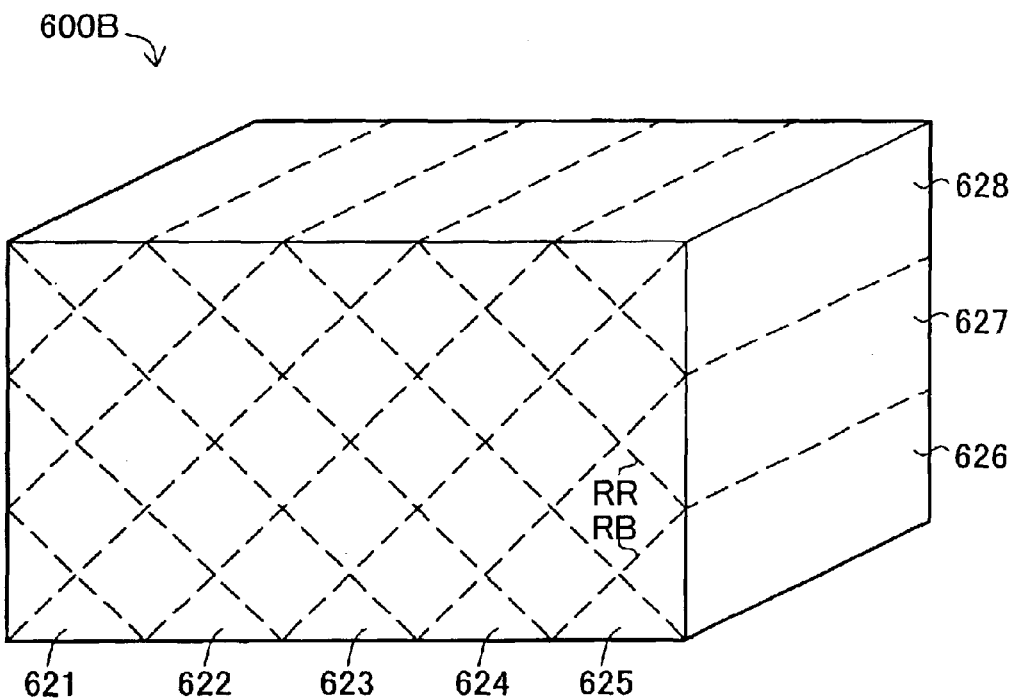
FIG. 10 is an explanatory diagram showing a second processed block 600B.

In Step S109, in the same manner as in Step S105, by sticking the eight second small blocks 621–628 together with adhesive, a second processed block is produced. FIG. 10 is an explanatory diagram showing a second processed block 600B. As shown in the drawing, the second processed block 600B has the outer shape of a substantially rectangular parallelopiped form, and the outer shape of the original block 600 of FIG. 4 is reproduced. The eight second small blocks 621–628 are stuck together in a condition such that the red light reflecting film RR is arranged at the interface of two adjacent second small blocks. The eight second small blocks 621–628 are also stuck together in such a way that each portion of the light transmissive member constituting each small block is placed in the same location within the original block 600.

At this time, as described in Step S105, it is preferable that the six faces of the second processed block 600B are polished.

Figure 11:
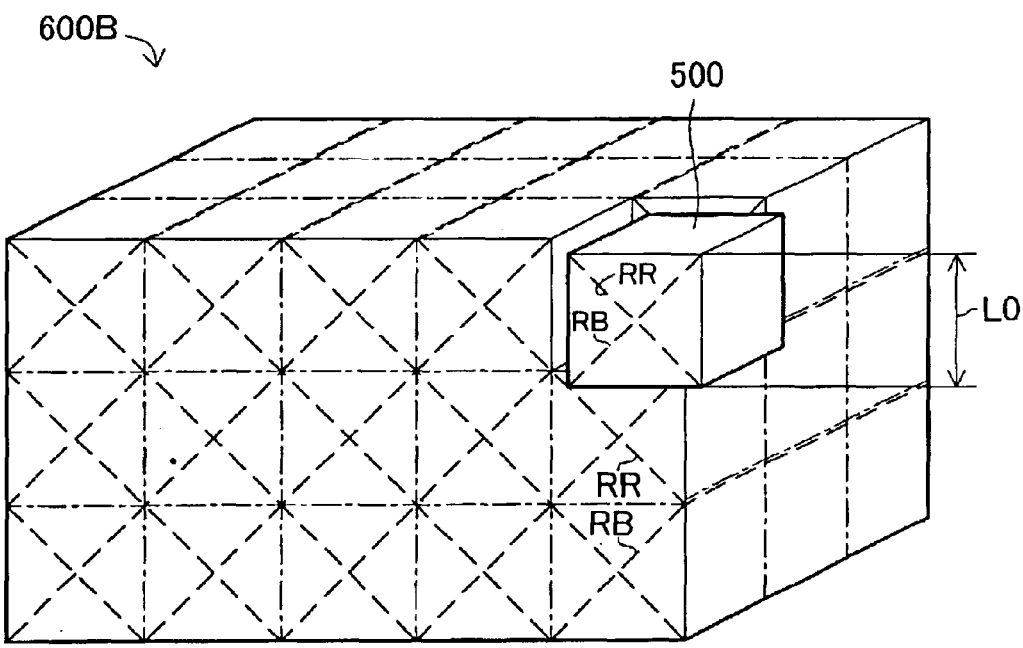
FIG. 11 is an explanatory diagram showing the aspect of cutting the second processed block 600B.

In Step S110, by cutting the second processed block 600B, a plurality of cross dichroic prisms are obtained. FIG. 11 is an explanatory diagram showing the aspect of cutting the second processed block 600B. As shown in the drawing, by cutting the second processed block 600B along a plurality of planes indicated by dashed lines, 45 cross dichroic prisms can be obtained having a substantially regular tetragonal columnar shape. The three kinds of planes indicated by dashed lines correspond to planes parallel to the three pairs of opposing faces of the second processed block 600B.

As will be understood from FIG. 11, dimension L1 in direction D1 of each first small block 611–618 shown in FIG. 5 and dimension L2 in direction D2 of each second small block 621–628 shown in FIG. 8 are $(2^{1/2}/2)$ times the dimension L0 of one side of a face at which the almost "X" shaped interface of one cross dichroic prism 500 appears.

In the manner described above, a plurality of cross dichroic prisms 500 can be manufactured simultaneously. The six faces of each cut cross dichroic prism 500 are to be polished.

Incidentally, in this embodiment, the seven planes (FIG. 5) perpendicular to the first direction D1 and seven planes (FIG. 8) perpendicular to the second direction D2, i.e. the cut faces in Steps S102, S106, are planes inclined by about 45 degrees with respect to each side of a pair of opposing faces S1, S2 of the original block 600. By cutting the first and second small blocks along such planes, as shown in FIG. 11, it is possible to obtain a plurality of cross dichroic prisms 500 without wasting the glass that forms the original block 600.

Figure 12:
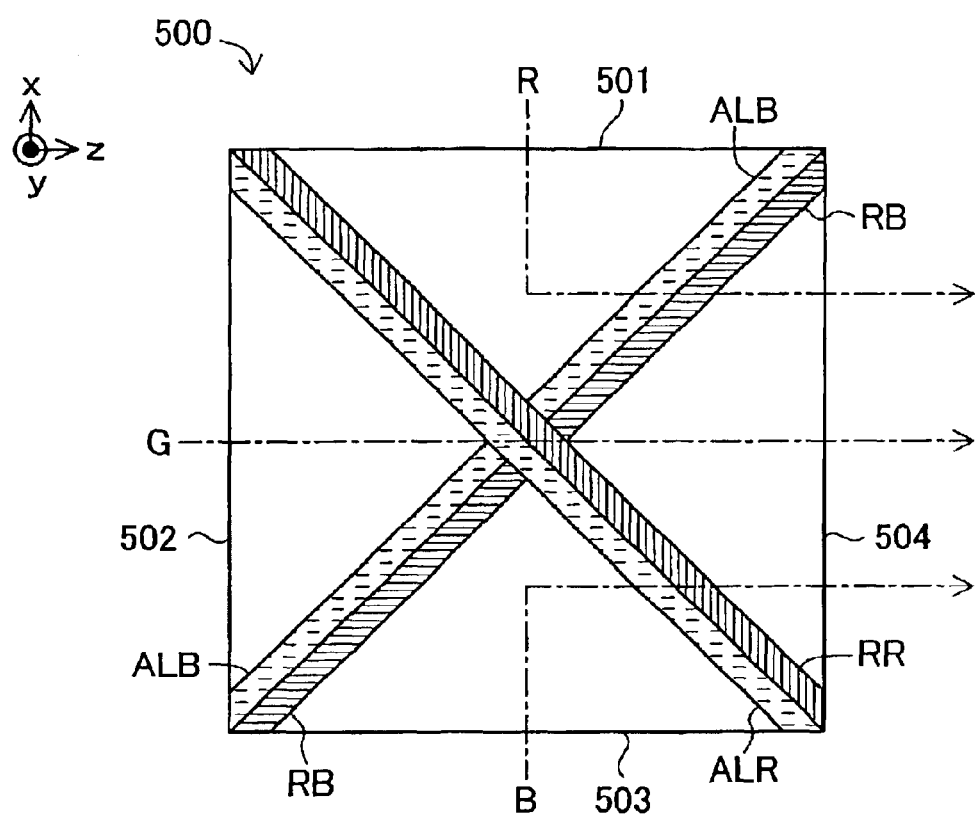
FIG. 12 is an explanatory diagram showing one manufactured cross dichroic prism 500 enlarged.

FIG. 12 is an explanatory diagram showing one manufactured cross dichroic prism 500 enlarged. FIG. 12 shows the cross dichroic prism 500 seen from the same direction as in FIG. 2. The cross dichroic prism 500 comprises four rectangular prisms 501–504. Each rectangular prism is an angular column prism having a bottom face with a substantially right angle isosceles triangular shape. At the almost "X" shaped interface formed by the four rectangular prisms 501–504, red light reflecting film RR and blue light reflecting film RB are formed. Specifically, blue light reflecting film RB is formed on the third and fourth rectangular prisms 503, 504, attached to the first and second rectangular prisms 501, 502 via an adhesive layer ALB. Continuous red light reflecting film RR is formed on the first pair of rectangular prisms 501, 504, attached to the second pair of rectangular prisms 502, 503 via the adhesive layer ALR. In FIG. 12, thicknesses of blue light reflecting film RB, red light reflecting film RR, and adhesive layers ALB, ALR are portrayed considerably exaggerated, for convenience in explanation.

As shown in FIG. 12, red light reflecting film RR is formed so as to extend continuously over the two rectangular prisms 501, 504, whereas blue light reflecting film RB is divided over the rectangular prisms 503, 504. This configuration is due to the fact that the blue light reflecting film RB (Step S104) is formed prior to the red light reflecting film RR (Step S108). In this embodiment, the reason for forming the two kinds of selective film in this order is to improve the optical characteristics of the cross dichroic prism.

Specifically, if a cross dichroic prism is manufactured by the procedure shown in FIG. 3, the first selective film (blue light reflecting film RB) formed previously must necessarily be segmented in Step S106. When subsequently sticking the second small blocks together in Step S109, the segmented two first selective films may in some instances not be arranged in the same plane. In the case that such a cross dichroic prism is used in a projector, linear striation due to segmentation of the first selective film formed previously may appear in the image projected onto the screen SC, so that the image is not expressed continuously. In this embodiment, to avoid as much as possible the occurrence of conspicuous linear striation, the blue light reflecting film RB is formed prior to the red light reflecting film RR. That is, the sensitivity of the human eye (visibility) is higher in the order: green light, red light, blue light. Accordingly, in this embodiment, by previously forming the blue light reflecting film RB, corresponding to blue light, which is not readily conspicuous, segmentation of the first selective film formed previously does not stand out. By so doing, an image can be expressed continuously.

As will be understood from the preceding explanation, in the case that two kinds of selective film, i.e. a green light reflecting film and a red light reflecting film, and in the case that two kinds of selective film, i.e. a green light reflecting film and a blue light reflecting film, are formed on a cross dichroic prism 500, it is preferable to set the green light reflecting film as the second selective film formed later.

In this embodiment, the first selective film (blue light reflecting film RB) and the second selective film (red light reflecting film RR) can be formed by laminating a dielectric film using an ion plating method, an ion assist method, a sputter method etc. The first selective film is formed in a state in which the first small block is heated to about 200° C. in a chamber, whereas the second selective film is formed in a state in which the second small block is heated to about 100° C. The reason that setting temperature differs between the first small blocks and second small blocks in this way is that the second small blocks include the adhesive layers ALB, together with the first selective film (blue light reflecting film RB). If the adhesive layer is heated, adhesive strength declines, and light transmittance declines as well. Thus, in this embodiment, the second small blocks are set to a relatively low temperature during the formation of the second selective film.

As described above, in this embodiment, cross dichroic prism 500 is produced from a single original block 600. Thus, variation in the refractive index of light-transmissive parts constituting the cross dichroic prism that occurs due to differences among lots etc. can be reduced, and reflection of light at the interface of the two rectangular prisms due to a difference of refractive index can be reduced. As a result, it is possible to improve the optical characteristics of the cross dichroic prism.

Also, as described above, the original block 600 prepared in this embodiment is produced by press forming of melting glass using a mold. With such an original block 600, it frequently happens that internal strain is generated during solidification of the melting glass, resulting in spatial variations in refractive index. However, differences in refractive index are relatively small in portions that are spatially proximal to one another. Thus, in Step S105 of this embodiment, the eight first small blocks are stuck together in such a way that each portion of the light-transmissive member constituting each first small block 611–618 is placed in the same location within the original block 600. The same is true as regards the second small blocks 621–628 in Step S109. By so doing, the refractive index of the four rectangular prisms constituting each cross dichroic prism 500 obtained in Step S110 can be substantially uniform. Thus, reflection of light at the interface of the two rectangular prisms due to a difference of refractive index can be further reduced. As a result, it is possible to further improve the optical characteristics of the cross dichroic prism.

Further, since the cross dichroic prism is manufactured without preparing four rectangular prisms separately as in the prior art, there are the following advantages.

When four rectangular prisms are prepared separately as in the prior art, there are instances in which "roundness" and "chipping" occur in the apex angle portion of rectangular prisms situated in the center of the cross dichroic prism. This is because it is difficult to individually cut the apex angle portion of each rectangular prism to about 90 degrees. Such "roundness" and "chipping" in the apex angle portion causes scattering of modulated light passing through the vicinity of the center of the cross dichroic prism, and generates linear striation and spot-like shadow in images. With the method of this embodiment, on the other hand, the formation to about 90 degrees of the apex angle portion of each rectangular prism 501–504 is possible without individually cutting the apex angle portion of each rectangular prism 501–504, so "roundness" and "chipping" of the apex angle portion can be reduced. That is, with this embodiment, by forming the cross dichroic prism without individually cutting apex angle portions, the optical characteristics of the cross dichroic prism 500 can be improved, and as a result, images can be expressed continuously.

The first selective film (blue light reflecting film RB) included in the cross dichroic prism 500 is segmented into two, and the two segmented first selective films are formed simultaneously on one first small block. Therefore, the two segmented first selective films have substantially the same optical characteristics. When four rectangular prisms are prepared separately as in the prior art, there are instances in which the optical characteristics (reflection characteristics and transmission characteristics) of the two first selective films included in the cross dichroic prism are different. In such instances, color in an image displayed on screen SC may differ on both sides of a centerline. That is, in this embodiment, two kinds of selective film RB, RR included in a single cross dichroic prism are each formed simultaneously, improving the optical characteristics of cross dichroic prism 500, as a result of which it is possible to make color distribution within an image substantially uniform.

Similarly, the adhesive layer ALB adjacent to the first selective film (blue light reflecting film RB) included in cross dichroic prism 500 is segmented into two as well as the first selective film, and the two segmented adhesive layers ALB are formed simultaneously at the interface of two adjacent first small blocks. Therefore, the two segmented adhesive layers ALB are formed with substantially the same thickness. When four rectangular prisms are prepared separately as in the prior art, there are instances in which adhesive layers situated adjacent to two first selective films included in cross dichroic prism differ in thickness. In such instances it becomes difficult to arrange the two selective films in the same plane. In such cases, as described above, linear striation appears in an image displayed on screen SC so that the image is not expressed continuously. That is, with the present embodiment, adhesive layers ALB, ALR adjacent to the two kinds of selective film RB, RR included in a single cross dichroic prism 500 are each formed simultaneously, whereby the optical characteristics of cross dichroic prism are improved, as a result of which it is possible to display an image continuously.

B. Second Embodiment

In the first embodiment, as shown in FIG. 2, the second polarizing plates 302Ro, 302Go, 302Bo at the light exiting sides of the liquid crystal light valves 300R, 300G, 300B are attached to light transmissive substrates 308, but may instead be attached to the cross dichroic prism 500. By so doing, the three light transmissive substrates 308 can be omitted.

In the way, when modulated light emitted from liquid crystal panels 301R, 301G, 301B enters the polarizing plates 302Ro, 302Go, 302Bo, they block light components other than a predetermined polarized component, and therefore generate heat. Such heat generation can lead to deterioration of polarizing plates, and it is therefore desirable for polarizing plate temperature to be as low as possible.

Thus, when polarizing plates 302Ro, 302Go, 302Bo are attached to a cross dichroic prism, it is preferable that the cross dichroic prism is made of a light transmissive member having relatively high thermal conductivity. Accordingly, in this embodiment, cross dichroic prisms are manufactured using a monocrystalline sapphire member of relatively high thermal conductivity as a light transmissive member.

Figure 13:
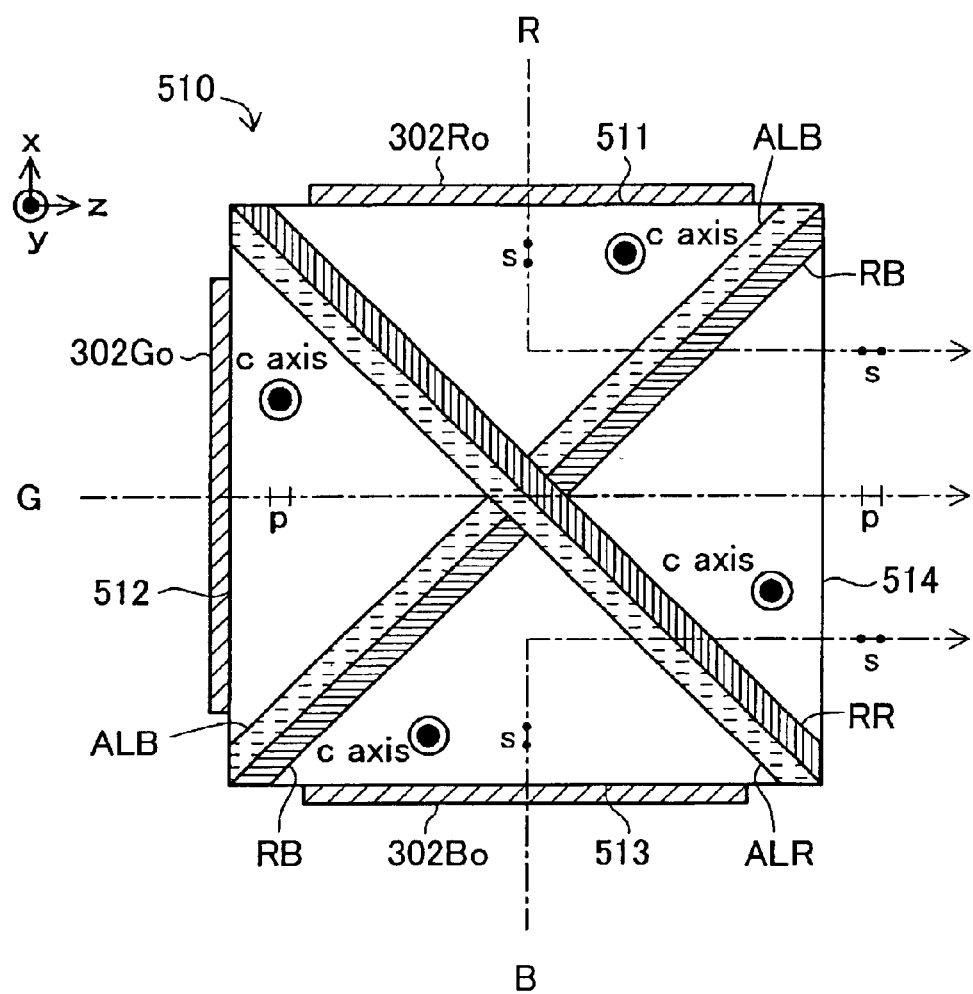
FIG. 13 is an explanatory diagram showing a cross dichroic prism 510 manufactured by using a monocrystalline sapphire member.

FIG. 13 is an explanatory diagram showing a cross dichroic prism 510 manufactured using a monocrystalline sapphire member. As shown in the drawing, on the three light incident faces of this cross dichroic prism 510 there are attached second polarizing plates 302Ro, 302Go, 302Bo constituting the liquid crystal light valves 300R, 300G, 300B.

In FIG. 13, linearly polarized lights emitted from two polarizing plates 302Ro, 302Bo are s-polarized light whose electric vector oscillates parallel to the y axis in the drawing, and linearly polarized light emitted from the other one polarizing plate 302Go is p-polarized light whose electric vector oscillates parallel to the x axis in the drawing. The efficiency of utilization of light in the cross dichroic prism 510 can be increased by causing linearly polarized light to enter. That is, the reflection characteristics of the two reflecting films RB, RR formed in cross dichroic prism 510 are better with s-polarized light than with p-polarized light, while conversely, light transmission characteristics are better with p-polarized light than with s-polarized light. Thus, s-polarized light is designated as the light to be reflected by the two reflecting films RB, RR, and p-polarized light is designated as the light to be transmitted through the two reflecting films RB, RR.

Incidentally, monocrystalline sapphire is a uniaxial crystal whose axis, called the c axis, is the optic axis. With monocrystalline sapphire, the refractive index in the c axis direction and the refractive index in the direction perpendicular to the c axis are different. The cross dichroic prism 510 shown in FIG. 13 is manufactured in such a way that the c axis of the monocrystalline sapphire is substantially aligned with the direction of the intersection line (direction y in the drawing) of the two kinds of selective film RB, RR formed at the interface of rectangular prisms 511–514. The c axis of the monocrystalline sapphire is set in this way so that the polarization state of linearly polarized light (s-polarized light or p-polarized light) entering the cross dichroic prism 510 is unchanged.

Specifically, when linearly polarized light enters a uniaxial crystal, in some instances it is changed to elliptically polarized light due to birefringence. However, as shown in FIG. 13, where the traveling direction of linearly polarized light is substantially perpendicular to the optical axis (c axis), and the electric vector of the linearly polarized light is set to be substantially parallel or perpendicular to the optic axis (c axis), the linearly polarized light is emitted with its polarization state substantially unchanged.

Figure 14:
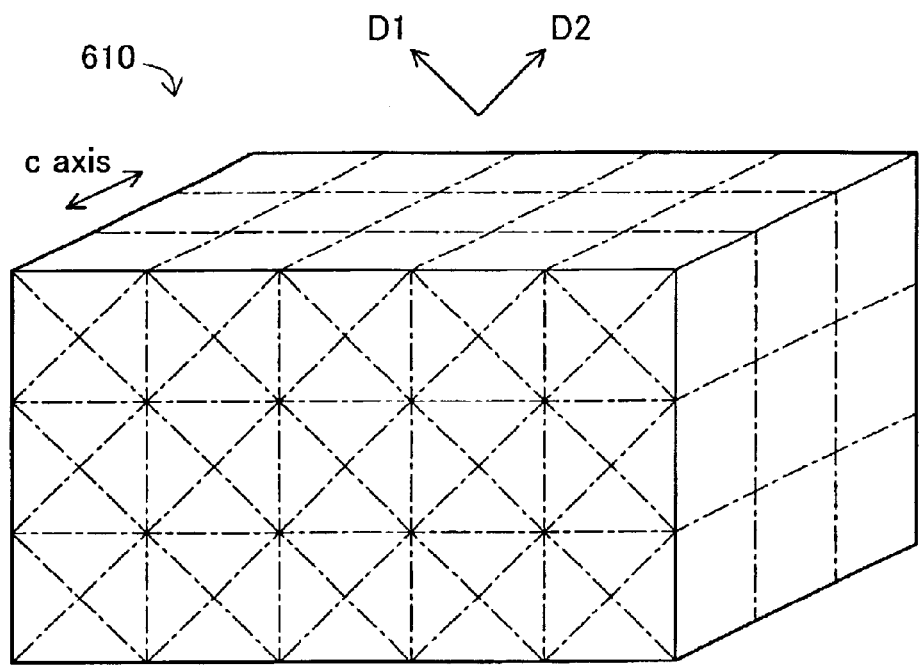
FIG. 14 is an explanatory diagram showing a block 610 formed by a monocrystalline sapphire member prepared to obtain the cross dichroic prism 510 of FIG. 13.

FIG. 14 is an explanatory diagram showing a block 610 formed of a monocrystalline sapphire member prepared to obtain the cross dichroic prism 510 of FIG. 13. As shown in the drawing, the block 610 of this embodiment also has an outer shape of a substantially rectangular parallelopiped form, and the c axis of the monocrystalline sapphire is set so as to be parallel to one side of block 610.

The cross dichroic prism 510 can then be manufactured by a procedure similar to the first embodiment (FIG. 3). In FIG. 14, the faces to be cut in Steps S102, S106, S110 of FIG. 3 are shown by dashed lines. The first direction D1 and second direction D2 that prescribe the cutting in Step S102, S106 are set to a substantially perpendicular direction with respect to the c axis of the monocrystalline sapphire.

Instead of using a monocrystalline sapphire member, a rock crystal member can be used. Here, rock crystal refers to monocrystalline $SiO_2$. Rock crystal, like monocrystalline sapphire, is a uniaxial crystal. Thus, the cross dichroic prism is preferably manufactured, as in FIG. 13, in such a way that the optic axis of the rock crystal (called the z axis) is substantially aligned with the direction of the intersection line (direction y in the drawing) of the two kinds of selective film formed at the almost X shaped interface of the rectangular prisms.

In this embodiment, the case of manufacturing cross dichroic prisms by using a monocrystalline sapphire member or rock crystal member, which are uniaxial crystals has been described, but other light transmissive members of relatively high thermal conductivity could be used as well. By using such light transmissive members, temperature rise of the cross dichroic prism per se can be reduced, and temperature rise of polarizing plates due to heat generation of polarizing plates attached to the cross dichroic prism can be reduced significantly. Generally, as light transmissive members of relatively high thermal conductivity, it is preferable to use members having thermal conductivity of at least about 5.0 W/(m·K), such as the above-mentioned monocrystalline sapphire member or rock crystal member.

C. Third Embodiment

When manufacturing a cross dichroic prism in the manner described in the first embodiment, the first selective film (blue light reflecting film RB) formed previously must necessarily be segmented in Step S106. In this case, when sticking the second small blocks together in Step S109, the segmented two first selective films may in some instances not be arranged in the same plane.

Figure 15:
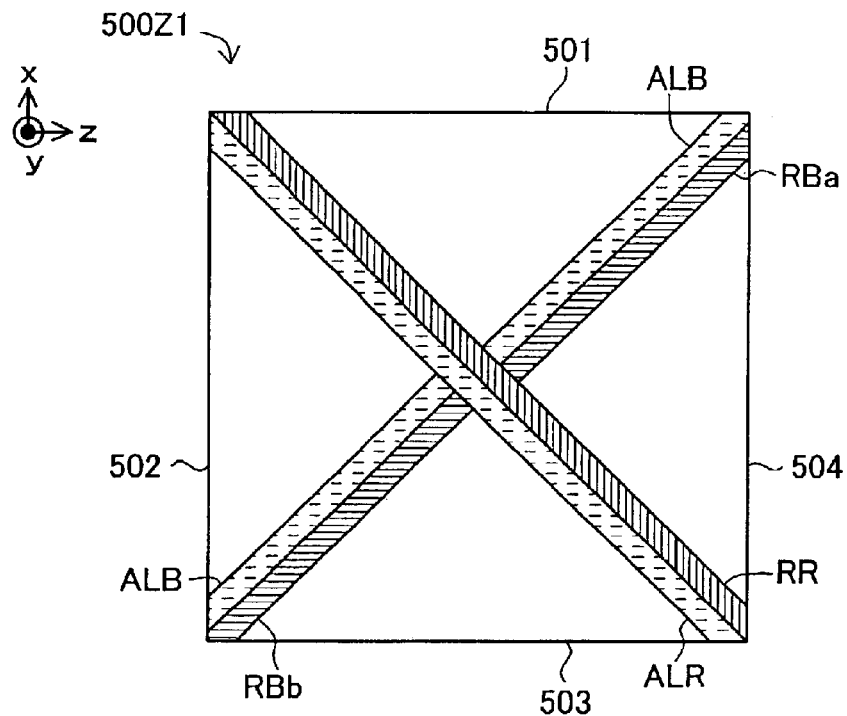
FIG. 15 is an explanatory diagram showing a first example of a cross dichroic prism in which the segmented two first selective films are not arranged in the same plane.

FIG. 15 is an explanatory diagram showing a first example of a cross dichroic prism in which the segmented two first selective films are not arranged in the same plane. In this cross dichroic prism 500Z1, the segmented two first selective films RBa, RBb are formed substantially perpendicular to the polished cut face of the first pair of rectangular prisms 501, 504 and the polished cut face of the second pair of rectangular prisms 502, 503, respectively. The two first selective films RBa, RBb are substantially parallel to each other, but are not arranged within the same plane.

Figure 16:
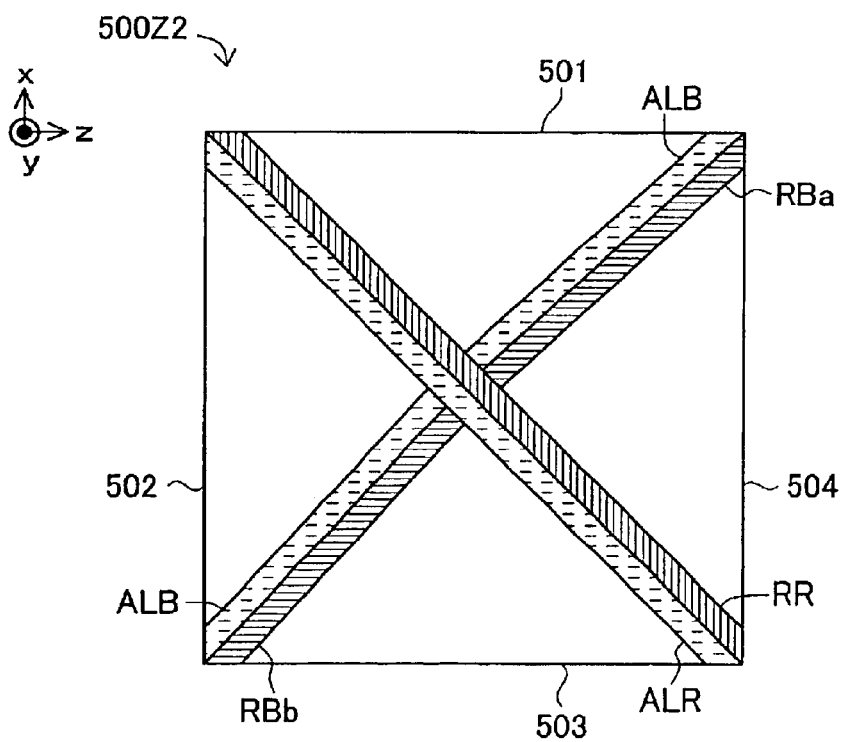
FIG. 16 is an explanatory diagram showing a second example of a cross dichroic prism in which the segmented two first selective films are not arranged in the same plane.

FIG. 16 is an explanatory diagram showing a second example of a cross dichroic prism in which the segmented two first selective films are not arranged in the same plane. In this cross dichroic prism 500Z2, the segmented two first selective films RBa, RBb are formed somewhat inclined with respect to the polished cut face of the first pair of rectangular prisms 501, 504 and the polished cut face of the second pair of rectangular prisms 502, 503, respectively. The two first selective films RBa, RBb are arranged so as to intersect each other, and are not arranged within the same plane.

When such a cross dichroic prism 500Z1, 500Z2 is used in a projector, in some instances an image projected onto a screen SC can not be expressed continuously. Accordingly, in this embodiment, the manufacturing method is manipulated so that the segmented two first selective films are placed within the same plane. That is, the manufacturing method of this embodiment is similar to that of the first embodiment (FIG. 3), but the outer shapes of the first and second processed blocks obtained in Steps S105, S109 are modified.

Figure 17:
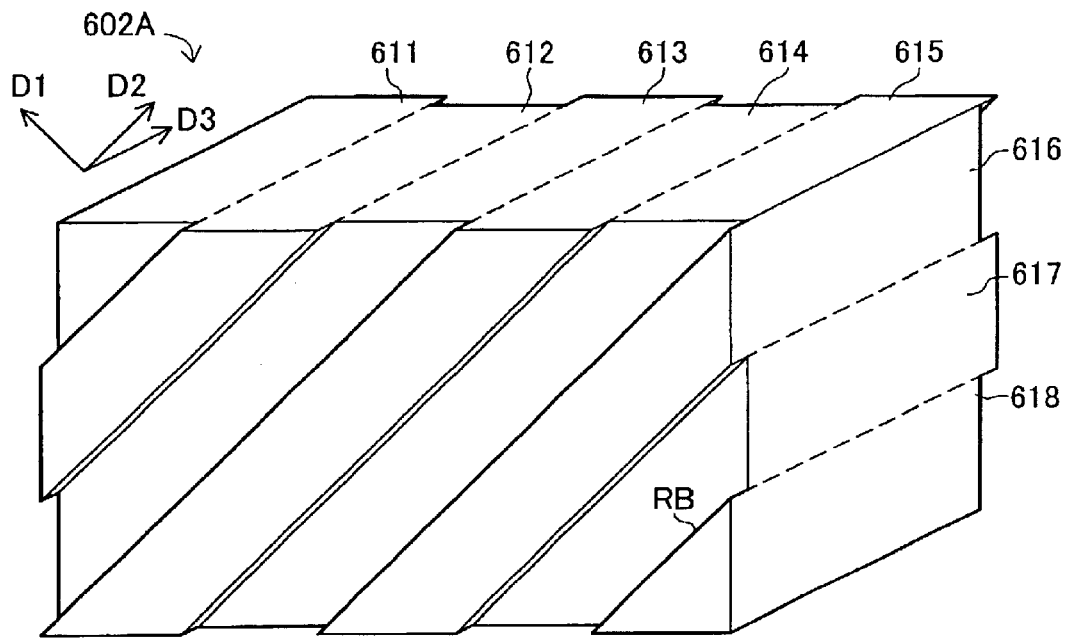
FIG. 17 is an explanatory diagram showing a first processed block 602A obtained in Step S105 of the third embodiment, and corresponds to FIG. 7.

FIG. 17 is an explanatory diagram showing a first processed block 602A obtained in Step S105 of the third embodiment, and corresponds to FIG. 7. As shown in the drawing, the plurality of first small blocks 611–618 are stuck together with adjacent two first small blocks alternately dislocated by a predetermined dimension in a third direction D3 in the drawing. Here, the third direction is a direction substantially perpendicular to the first and second directions D1, D2 (FIG. 5, FIG. 8). The first small blocks 611–681 are stuck together such that each portion of the light transmissive member constituting each small block is placed in substantially the same location within the original block 600.

Figure 18:
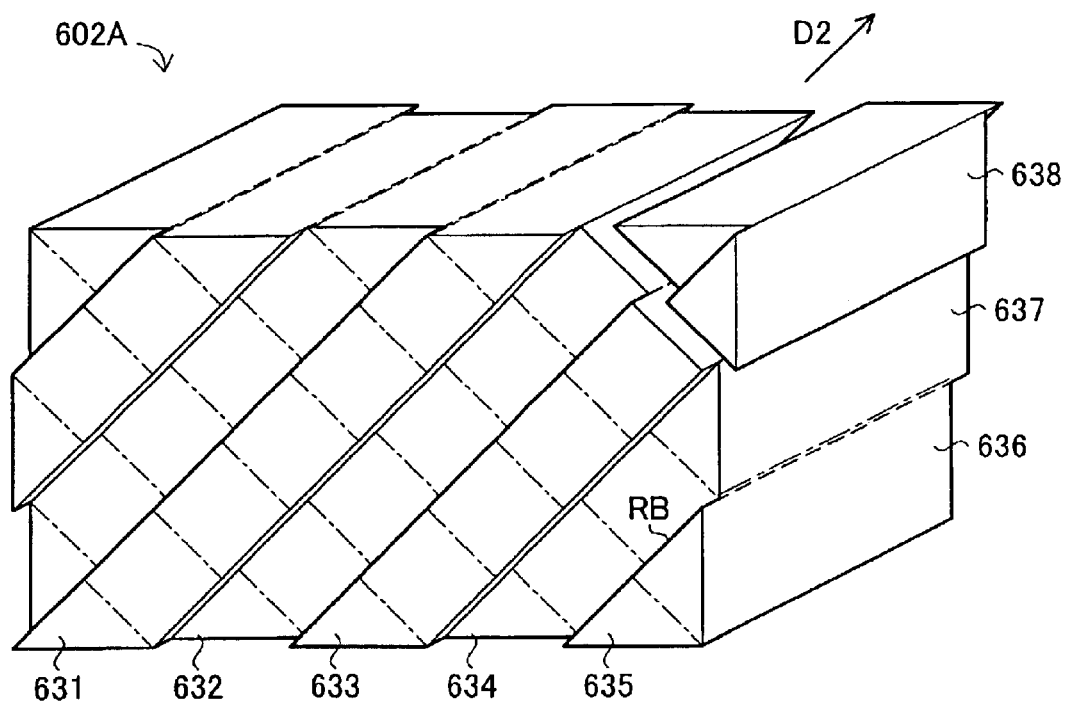
FIG. 18 is an explanatory diagram showing the aspect of cutting the first processed block 602A, and corresponds to FIG. 8.

In Step S106, as in the first embodiment, by cutting the first processed block 602A, a plurality of second small blocks are obtained. FIG. 18 is an explanatory diagram showing the aspect of cutting the first processed block 602A, and corresponds to FIG. 8. As shown in the drawing, the first processed block 602A is cut along seven planes indicated by dashed lines, so as to obtain eight second small blocks 631–638.

Figure 19:
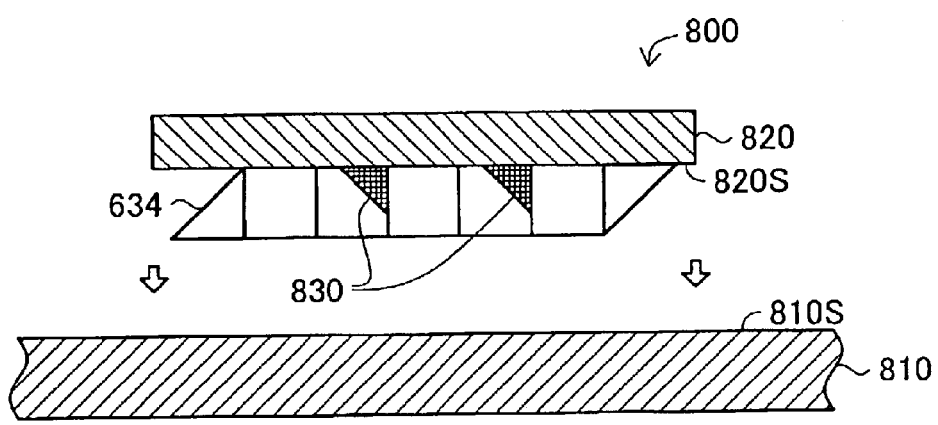
FIG. 19 is an explanatory diagram representatively depicting aspect of the polishing process.

In Step S107, the cut faces of the second small blocks 631–638 are polished. In the way, in this embodiment the plurality of first small blocks 611–618 are stuck together with adjacent two first small blocks alternately dislocated. Thus, this "dislocation" can be utilized when performing the polishing process. FIG. 19 is an explanatory diagram depicting a representative aspect of the polishing process. As shown in the drawing, polishing device 800 comprises a polishing stage 810 and a holder 820. The bottom face 820S of the holder is set parallel to the top face 810S of the polishing stage. During the polishing process, the polishing stage rotates about a shaft that is not shown, and the holder descends towards the polishing stage. In FIG. 19, the No. 4 second small block 634 shown in FIG. 18 is the processing target. The holder 820 holds the second block 634 by using polishing jigs 830 of columnar shape having a right triangular bottom face. One of the two rectangular faces of polishing jig 830 contacts the dislocated face of small block 634, and the other contacts the bottom face 820S of the holder. The holder 820, polishing jig 830 and small block 634 are joined by means of adhesive. In this way, by using the dislocated face as a reference face for the polishing process, the cut face of small block 634 can be polished in a direction perpendicular with respect to the dislocated face (i.e., the face on which the first selective film is formed). By means of this, the problem described in FIG. 16 can be avoided, and the segmented two first selective films RBa, RBb can be formed substantially perpendicular to the polished cut faces of the pair of rectangular prisms.

Later, in Step S108, second selective films (red light reflecting films RR) are formed for the eight second small blocks 631–638. Then, in Step S109, the eight second small blocks 631–638 are stuck together with adhesive so as to produce a second processed block.

Figure 20:
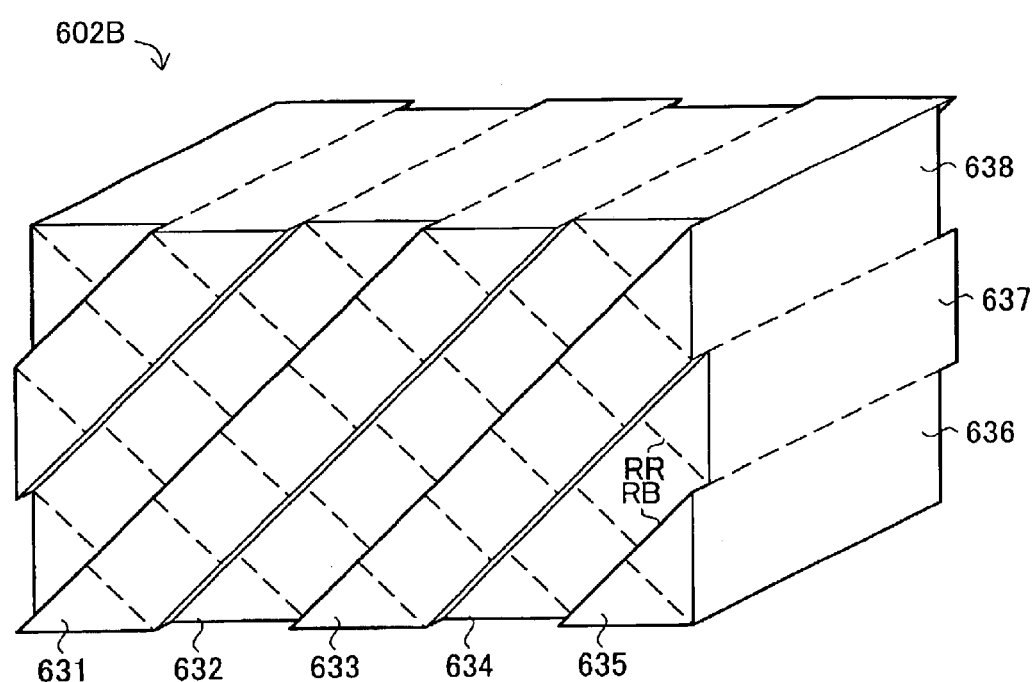
FIG. 20 is an explanatory diagram showing a second processed block 602B obtained in Step S109 of the third embodiment, and corresponds to FIG. 10.

FIG. 20 is an explanatory diagram showing a second processed block 602B obtained in Step S109 of the third embodiment, and corresponds to FIG. 10. As shown in the drawing, the plurality of second small blocks 631–638 are stuck together so as to reproduce the outer shape of the first processed block 602A shown in FIG. 17. The second small blocks 631–638 are stuck together so that each portion of the light transmissive member constituting each small block is placed in the same location within the first processed block 602A. In the way, in this embodiment, the aforementioned "dislocation" can be used when performing the sticking together process of the plurality of second small blocks. That is, the second small blocks 631–638 can be stuck together in a state such that the dislocated faces included in the second small blocks 631–638 are aligned in the same plane by using a jig. By this means, the problems described in FIGS. 15 and 16 can be avoided, and the two selective films RBa, RBb segmented due to cutting out of the plurality of second small blocks can be easily arranged within the same plane.

Subsequently, in Step S110, by cutting the second processed block 600B, a plurality of cross dichroic prisms are obtained.

As described above, in this embodiment, in Step S105 (FIG. 17), the plurality of first small blocks 611–618 are stuck together in a state in which adjacent two first small blocks are alternately dislocated in the third direction. Also, in Step S109 (FIG. 20), the plurality of second small blocks 631–638 are stuck together so as to reproduce the outer shape of the first processed block 602A. By so doing, as shown in FIG. 12, it is possible to obtain relatively easily a cross dichroic prism in which the segmented two first selective films are arranged in the same plane.

In this embodiment, the plurality of first small blocks 611–618 are stuck together in a state in which adjacent two first small blocks are alternately dislocated in the third direction D3, but instead can be stuck together sequentially dislocated in the third direction D3. However, by employing this embodiment, there is the advantage that the amount of wasted light transmissive member can be reduced when obtaining the plurality of cross dichroic prisms in Step S110.

As described in the second embodiment, a cross dichroic prism may be manufactured by using uniaxial crystal members such as a monocrystalline sapphire member or a rock crystal member. In this case, it is preferable that the first direction D1 and second direction D2 that prescribe cutting in Step S102, S106 are set to a substantially perpendicular direction with respect to the optic axis of the monocrystalline sapphire or rock crystal (c axis or z axis). That is, the optic axis should be set parallel to the third direction D3 in FIG. 17.

The present invention is not restricted to the above embodiments or its modifications, but there may be many other modifications, changes, and alterations without departing from the scope or spirit of the main characteristics of the present invention. Some examples of possible modification are given below.

(1) In the second embodiment, the second polarizing plates on the light exiting sides of the liquid crystal light valves are attached to the three light incident faces of the cross dichroic prism. In such a case, it is preferable that, of the six face of the cross dichroic prism, at least one of the two faces through which light does not pass (i.e. the bottom face and top face) be placed in contact with a heat sink. For example, a metal cooling fin could be joined to the top face, and a metal base frame that carries the projector 1000 joined to the bottom face. By so doing, temperature rise due to heat generation of the polarizing plates can be further reduced.

In the above embodiments, a polarizing plate is provided on the light exiting side of each liquid crystal light valve, but in some cases a retardation plate is provided. In such a case, the retardation plate may be attached to the light incident face of the cross dichroic prism. By so doing, temperature rise due to heat generation of the retardation plate can be reduced.

(2) In the above embodiments, each first selective film (blue light reflecting film RB) is formed on one cut face of each of the seven first small blocks 612–618, but could instead be formed, for example, on both cut faces of three, i.e. No. 2, No. 4 and No. 6, first small blocks 612, 614, 616, and on one cut face of No. 8. The same is true of the second selective films (red light reflecting films RR).

Generally, the first selective film will be formed on the cut faces of at least some of the plurality of first small blocks. Specifically, a first selective film will be formed such that the first selective film is placed at the interface of adjacent two first small blocks within a first processed block obtained by sticking together a plurality of first small blocks. The same is true of the second selective film.

(3) In the above embodiments, in Step S102 of FIG. 3, the block is cut along a plurality of planes perpendicular to a first direction so as to obtain a plurality of first small blocks, but instead of this, the block may be cut along a single plane perpendicular to a first direction so as to obtain two first small blocks.

In Step S106, the first processed block is cut along a plurality of planes perpendicular to a second direction so as to obtain a plurality of second small blocks, but instead of this, the first processed block may be cut along a single plane perpendicular to a second direction so as to obtain two second small blocks.

In this way, by cutting along a single plane in Steps S102, S106, only a single almost X shaped interface appears in the second processed block. In this case, at least one cross dichroic prisms can be obtained from the second processed block. That is, in the case that the second processed block is relatively short in the direction of the intersection line of the two kinds of selective film formed at the almost X shaped interface, a single cross dichroic prism may be obtained, and when relatively long, at least two cross dichroic prisms can be obtained.

Generally, a plurality of first small blocks will be obtained by cutting an original block along at least one plane perpendicular to a first direction. Also, a plurality of second small blocks will be obtained by cutting a first processed block along at least one plane perpendicular to a second direction. That is, the invention permits forming at least one light-selective prism by means of cutting a single block in the above-described manner.

(4) In the above embodiments, cross dichroic prism 500 is used as a colored light combining optical system to combine three colored lights, but by reversing the traveling direction of light, it could be used also as a colored light separating optical system. That is, by causing white light to enter the light exiting face of cross dichroic prism 500 and causing three colored lights to exit from the light incident faces of cross dichroic prism 500, utilization as a colored light separating optical system is possible. Accordingly, it is possible to use this prism in place of the colored light separating optical system 200 in FIG. 1.

Generally, the present invention is applicable to the manufacture of a light-selective prism, which has a substantially regular tetragonal columnar outer shape and includes two kinds of selective films formed on an almost X shape interface, each selective film selecting colored light having wavelengths of a predetermined range.

Industrial Applicability

This invention is applicable to the manufacture of a projector for projecting and displaying images.

What is claimed is:

1. A method for manufacturing a light-selective prism having a substantially regular tetragonal columnar outer shape and including two kinds of selective films formed on an almost X shape interface of the prism, each selective film selecting colored light having wavelengths of a predetermined range, the manufacturing method comprising the steps of:

(a) preparing a block formed of a light transmissive member;

(b) cutting the block along at least one plane perpendicular to a first direction so as to obtain a plurality of first small blocks whose dimension in the first direction is substantially equal to a predetermined dimension;

(c) forming a first selective film on a cut face of at least one of the plurality of the first small blocks;

(d) sticking the plurality of the first small blocks together so as to obtain a first processed block in which the first selective film is situated at an interface of adjacent two first small blocks;

(e) cutting the first processed block along at least one plane perpendicular to a second direction that is substantially perpendicular to the first direction so as to obtain a plurality of second small blocks whose dimension in the second direction is substantially equal to the predetermined dimension;

(f) forming a second selective film on a cut face of at least one of the plurality of the second small blocks;

(g) sticking the plurality of the second small blocks together so as to obtain a second processed block in which the second selective film is situated at an interface of adjacent two second small blocks; and (h) obtaining at least one light-selective prism from the second processed block.

2. The manufacturing method according to claim 1, wherein the step (b) includes polishing cut faces of the first small blocks; and the step (c) includes polishing cut faces of the second small blocks.

3. The manufacturing method according to claim 1, wherein the step (h) includes culling the second processed block so as to obtain a plurality of the light-selective prisms.

4. The manufacturing method according to claim 1, wherein
the step (d) includes sticking the plurality of the first small blocks together such that the outer shape of the block is reproduced; and
the step (g) includes sticking the plurality of the second small blocks together such that the outer shape of the black is reproduced.

5. The manufacturing method according to claim 4, wherein
the step (d) includes sticking the plurality of the first small blocks together such that each portion of the light transmissive member constituting each first small block is placed in the same location within the block; and
the step (g) includes sticking the plurality of the second small blocks together such that each portion of the light transmissive member constituting each second small block is placed in the same location within the block.

6. The manufacturing method according to claim 1, wherein
the step (d) includes sticking the plurality of the first small blocks together in a state in which adjacent two first small blocks are dislocated in a direction substantially perpendicular to the first and tho second directions; and
the step (g) includes sticking the plurality of the second small blocks together such that an outer shape of the first processed block is reproduced.

7. The manufacturing method according to claim 6, wherein
the step (d) includes sticking the plurality of the first small blocks together such that each portion of the light transmissive member constituting each first small block is placed in substantially the same location within the block; and
the step (g) includes sticking the plurality of the second small blocks together such that each portion of the light transmissive member constituting each second small block is placed in the same location within the first processed block.

8. The manufacturing method according to claim 1, wherein
the first selective film is a blue light reflecting film for selectively reflecting blue light; and
the second selective film is a red light reflecting film for selectively reflecting red light.

9. The manufacturing method according to claim 1, wherein
the block has a substantially rectangular parallelopiped shape; and
the at least one plane perpendicular to the first direction and the at least one plane perpendicular to the second direction are set to planes inclined by about 45 degrees with respect to each side of one pair of opposing faces of the block.

10. The manufacturing method according to claim 1, wherein the light transmissive member is a member having a thermal conductivity of at least about 5.0 W/(m·K).

11. The manufacturing method according to claim 10, wherein
the light transmissive member is a uniaxial crystal member; and
the first and second directions are set to directions substantially perpendicular to an optic axis of the uniaxial crystal.

12. The manufacturing method according to claim 11, wherein the uniaxial crystal member is a monocrystalline sapphire member.

13. The manufacturing method according to claim 11, wherein the uniaxial crystal member is a rock crystal member.

* * * * *